I. C. HAWES.
NUT LOCK.
APPLICATION FILED MAR. 25, 1911.
1,016,146.
Patented Jan. 30, 1912.
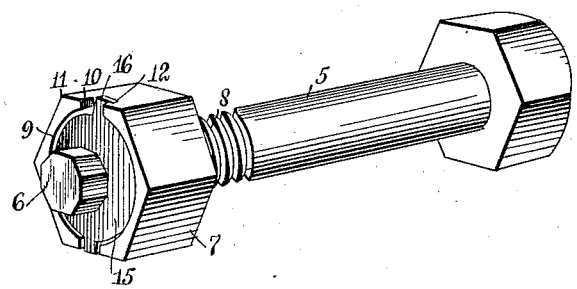
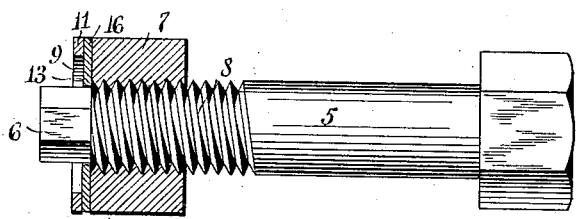
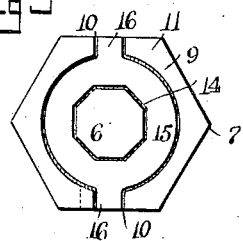
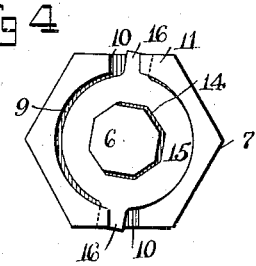
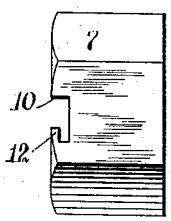
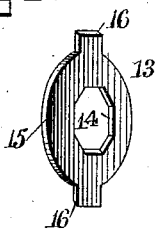
WITNESSES:
C. J. Hachenberg
E. B. Marshall
INVENTOR
Ithamar C. Hawes
BY Munn & Co
ATTORNEYS

UNITED STATES PATENT OFFICE.

ITHAMAR C. HAWES, OF SHERMAN, CONNECTICUT.

NUT-LOCK.

1,016,146.  Specification of Letters Patent.  Patented Jan. 30, 1912.

Application filed March 25, 1911. Serial No. 616,911.

*To all whom it may concern:*

Be it known that I, ITHAMAR C. HAWES, a citizen of the United States, and a resident of Sherman, in the county of Fairfield and State of Connecticut, have invented a new and Improved Nut-Lock, of which the following is a full, clear, and exact description.

My invention relates to nut locks, and it has for its object to provide one having few parts, which may be manufactured at little expense, the lock being so constructed that it may be readily secured with a certainty that it will remain in place until it is removed at the will of the mechanic.
Additional objects of the invention will appear in the following complete specification, in which the preferred form of my invention is disclosed.

In the drawings similar characters of reference indicate corresponding parts in all the views, in which—

Figure 1 is a perspective view showing my improved nut lock; Fig. 2 is a longitudinal sectional view of Fig. 1; Fig. 3 is an end view showing the locking member in position; Fig. 4 is a similar view but with the nut turned to secure the fingers of the locking member in the under-cut portions of a nut; Fig. 5 is a side elevation of the nut; and Fig. 6 is a perspective view of the locking member.

By referring to the drawings it will be seen that a bolt 5 is provided having an angular terminal 6, a nut 7 being provided to engage the threaded portion 8 of the bolt 5. This nut 7 has a recess 9 at its outer end, there being openings 10 in the wall 11 surrounding the said recess 9. In the wall 11 there are two under-cut portions 12, which are connected with the openings 10 respectively. In connection with the bolt and nut I provide a locking member 13, having an angular opening 14, adapted to fit the angular terminal 6 of the bolt 5, the body 15 of this locking member 13 being adapted to be disposed in the recess 9, with its fingers 16 disposed in the openings 10 in the wall 11, surrounding the recess 9 in the said nut 7. When the locking member is disposed in the said recess 9 with its fingers 16 disposed in the openings 10, it will be seen that when the bolt is rotated slightly, the fingers 16 will be disposed in the under-cut portions 12, by which means the displacement of the locking member 13 is prevented, and the nut 7 is held against rotation relatively to the bolt 5.

Having thus described my invention, I claim as new and desire to secure by Letters Patent:

In a nut lock a bolt having an angular terminal, a nut engaging the bolt and having a recess at one end with the wall at the side of the recess having an opening and an under-cut recess in the wall leading to the opening, and a locking member having an angular opening fitting the angular terminal and a finger, the locking member being normally disposed in the recess at the end of the nut, with its finger in the under-cut recess in the wall.

In testimony whereof I have signed my name to this specification in the presence of two subscribing witnesses.

ITHAMAR C. HAWES.

Witnesses:
MARCUS G. MERWIN,
PERRY E. GREEN.

---

Copies of this patent may be obtained for five cents each, by addressing the "Commissioner of Patents, Washington, D. C."